United States Patent
Malmgren et al.

(10) Patent No.: US 12,121,038 B2
(45) Date of Patent: Oct. 22, 2024

(54) METHOD FOR PRODUCING A HEAT-TREATED CONCENTRATED DAIRY PRODUCT

(71) Applicant: Tetra Laval Holdings & Finance S.A., Pully (CH)

(72) Inventors: Bozena Malmgren, Lund (SE); Flemming Mogensen, Grenaa (DE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 17/757,164

(22) PCT Filed: Dec. 11, 2020

(86) PCT No.: PCT/EP2020/085784
§ 371 (c)(1),
(2) Date: Jun. 10, 2022

(87) PCT Pub. No.: WO2021/116421
PCT Pub. Date: Jun. 17, 2021

(65) Prior Publication Data
US 2023/0059988 A1    Feb. 23, 2023

(30) Foreign Application Priority Data
Dec. 13, 2019    (EP) .................... 19216104

(51) Int. Cl.
*A23C 1/14*    (2006.01)
*A23C 3/02*    (2006.01)
*A23C 9/142*    (2006.01)

(52) U.S. Cl.
CPC .................. *A23C 1/14* (2013.01); *A23C 3/02* (2013.01); *A23C 9/1427* (2013.01)

(58) Field of Classification Search
CPC ............ A23C 1/14; A23C 3/02; A23C 9/1427
USPC ................. 426/422, 580, 490, 491
See application file for complete search history.

(56) References Cited

U.S. PATENT DOCUMENTS

| 2008/0008813 A1 | 1/2008 | Maron et al. |
| 2017/0258103 A1 | 9/2017 | McCloskey et al. |
| 2018/0084796 A1 | 3/2018 | Borcherding |

FOREIGN PATENT DOCUMENTS

| CN | 1536964 A | 10/2004 |
| JP | H08-89165 | 4/1996 |
| WO | WO 1992/21245 | 12/1992 |
| WO | WO 9221245 A1 | 12/1992 |
| WO | WO 2008/002492 | 1/2008 |
| WO | WO 2015/175710 | 11/2015 |
| WO | WO 2019/004149 | 1/2019 |

OTHER PUBLICATIONS

International Search Report and Written Opinion of PCT/EP2020/085784, dated Feb. 11, 2021, in 10 pages.

*Primary Examiner* — Jeffrey P Mornhinweg
(74) *Attorney, Agent, or Firm* — Knobbe, Martens, Olson & Bear, LLP

(57) ABSTRACT

The present invention relates to a method (200) for producing a heat-treated concentrated dairy product (cdp). The method (200) comprising the steps of passing (210) the dairy product (dp) under a pre-determined pressure through a reverse osmosis, RO, filter (110) at a first temperature, the pre-determined pressure being sufficient to allow reverse osmosis, thereby concentrating the dairy product (dp). Pre-heating (230) the concentrated dairy product (dp) at a second temperature for a second period of time to stabilize the concentrated dairy product (dp). Homogenizing (240) the stabilized concentrated dairy product (dp) to reduce a size of particles in the stabilized concentrated dairy product (dp). Heating (250) the stabilized concentrated dairy product (dp) at a third temperature for a third period of time to reduce microorganisms in the stabilized concentrated dairy product (dp), thereby forming the heat-treated concentrated dairy product (cdp).

9 Claims, 2 Drawing Sheets

METHOD FOR PRODUCING A HEAT-TREATED CONCENTRATED DAIRY PRODUCT

TECHNICAL FIELD

The inventive concept relates to a method for producing a heat-treated concentrated dairy product.

BACKGROUND ART

Concentrated dairy products such as condensed milk have become popular over the last years. The condensed milk contains important nutrients of milk such as calcium, protein, idiom, potassium, and vitamin B2 and B12. The condensed milk is obtained by removing roughly 60% of water from the milk. Conventionally the condensed milk has been produced by evaporating the milk. In addition, the evaporation of milk requires excessive amounts of energy for heating and hence is expensive. Therefore, there is a need to provide a method, to at least partly, address the abovementioned limitations.

SUMMARY

It is an object of the present inventive concept to at least partly overcome one or more of the above-identified limitations of the prior art. In particular, it is an object of the present inventive concept to provide a method for producing a heat-treated concentrated dairy product with a lower cost and in a manner which may at least reduce thermal impact, compared to the conventional evaporation method. Another object of the present inventive concept is to enable a method to produce heat-treated concentrated dairy products which allows for that less space is required during production as compared to the conventional evaporation method.

According to an aspect of the present inventive concept there is provided a method for producing a heat-treated concentrated dairy product, the method comprising the steps of passing the dairy product under a pre-determined pressure through a reverse osmosis, RO, filter at a first temperature, the pre-determined pressure being sufficient to allow reverse osmosis, thereby concentrating the dairy product, pre-heating the concentrated dairy product at a second temperature for a second period of time to stabilize the concentrated dairy product, homogenizing the stabilized concentrated dairy product to reduce a size of particles in the stabilized concentrated dairy product, and heating the stabilized concentrated dairy product at a third temperature for a third period of time to reduce microorganisms in the stabilized concentrated dairy product, thereby forming the heat-treated concentrated dairy product.

The step of passing the dairy product through the RO filter allows for concentrating the dairy product. Thereby, there is no need for evaporation of the dairy product which in turn reduces the thermal impact on the concentrated dairy product. In addition, the step of passing the dairy product through the RO filter allows to produce the heat-treated concentrated dairy product with a lower cost at least by reducing the energy consumption as compared to traditional heating. The step of passing the dairy product may be performed by using one RO filter or a plurality of RO filters arranged in series such that an inlet of a RO filter may be arranged downstream an outlet of an adjacent RO filter. Moreover, a plurality of RO filters may be arranged in parallel. A plurality of RO filters may be arranged in series and in parallel. In other words, the dairy product may be passed through parallel RO filters where each RO filter may include a plurality of RO filters arranged in series.

The step of pre-heating the concentrated dairy product allows stabilization of proteins of the concentrated dairy product. In other words, the step of pre-heating allows the proteins of the dairy product to withstand the heat during the step of heating. In addition, the step of pre-heating the concentrated dairy product contributes to the stabilization of the heat-treated concentrated dairy product against sedimentation during storage.

The step of homogenizing the stabilized concentrated dairy product allows for reducing a size of particles in the stabilized concentrated dairy product. The step of homogenizing also contributes to the stabilization of the heat-treated concentrated dairy product against sedimentation during storage. In addition, the step of homogenizing the stabilized concentrated dairy product improves sensory properties of the heat-treated concentrated dairy product such as viscosity, taste and texture.

The step of heating the stabilized concentrated dairy product allows reducing microorganisms in the stabilized concentrated dairy product. Thereby, the step of heating allows for forming the heat-treated concentrated dairy product. Some examples of the heating are ultra-high temperature (UHT) treatment and pasteurization processes. The step of heating contributes to stabilization of the heat-treated concentrated dairy product against sedimentation during storage.

The abovementioned method steps may be performed in any order, provided that the step of pre-heating is performed prior to the step of heating. For instance, the step of passing the dairy product through the RO filter may be performed subsequent to the step of pre-heating or the step homogenizing may be performed subsequent to the step of heating.

By a "concentrated dairy product" is hereby meant a dairy product with a substantially lower water content as compared to starting or native dairy product.

By "concentrating the dairy product" is hereby meant removing water from the dairy product. For instance, roughly 60% of water from the dairy product may be removed.

By "stabilize" is hereby meant stabilizing proteins of the dairy product such that the proteins of the dairy product withstand the step of heating. By "stabilize" is also meant that the heat-treated concentrated dairy product remains stable such that no or little sedimentation occurs during storage.

The method may further comprise, subsequent to the step of passing the dairy product through the RO filter, adding a stabilizing salt to the concentrated dairy product. The optional step of adding the stabilizing salt may assist stabilizing proteins of the dairy product to withstand the heat during the step of heating. The optional step of adding the stabilizing salt may also assist stabilization of the heat-treated concentrated dairy product against sedimentation during storage.

The step of passing the dairy product through the RO filter may further comprise circulating the dairy product through the RO filter until a pre-determined concentration of the dairy product is achieved. The circulation of the dairy product through the same RO filter may at least allow a more compact RO filter by for instance not requiring more space to arrange a plurality of RO filters. The circulation of the dairy product through the same RO filter may be performed by a loop pump. The loop pump may hence control flow of the dairy product over the RO filter. This may in turn prevent or at least reduce fouling of the RO filter. However, the dairy product may be circulated through one RO filter or a plurality of RO filters arranged in series such that an inlet of a RO filter may be arranged downstream an outlet of an adjacent RO filter. Moreover, the dairy product may be circulated through a plurality of RO filters arranged in parallel, or plurality of RO filters arranged in series and in parallel.

The step of pre-heating the concentrated dairy product may be performed subsequent to the step of passing the dairy product through the RO filter. Thereby the stabilized concentrated dairy product may already have a higher temperature prior to the heating step. This may in turn reduce energy consumption by e.g. saving energy for increasing a temperature of the stabilized concentrated dairy product prior to the step of heating.

The step of pre-heating the concentrated dairy product may be performed prior to the step of passing the dairy product through the RO filter. This may in turn improve a flexibility of the method for producing the heat-treated concentrated dairy product.

A total solid content of the heat-treated concentrated dairy product may be in a range from 25 to 32 wt %. Thereby, the water content of the heat-treated concentrated dairy product may be in a range from 75 to 68 wt %. By "total solid content" is hereby meant any substance in the dairy product except water. The total solid content comprises a fat content and a solid not fat content (SNF). Examples of such SNF content are protein, mineral and lactose.

A fat content of the heat-treated concentrated dairy product may be in a range from 5 to 15 wt %. The fat content of the heat-treated concentrated dairy product may be double or triple, compared to the starting or native dairy product.

The first temperature may be within a range of 0 to 10° C. In other words, the step of passing the dairy product through the RO filter may be performed at the temperature within a range of 0 to 10° C. Thereby, the dairy product may not be heated during the step of passing. This may in turn reduce a total energy consumption for producing the heat-treated concentrated dairy product.

The second temperature may be within a range of 95 to 125° C. The second period of time may be within a range of 30 sec to 6 min. Thereby, the step of pre-heating the concentrated dairy product at the second temperature within a range of 95 to 125° C. for the second period of time within a range of 30 sec to 6 min may stabilize the concentrated dairy product.

The pre-determined pressure may be within a range of 21 to 32 bar. In other words, the step of passing the dairy product through the RO filter may be performed under the pre-determined pressure within a range of 21 to 32 bar. The pre-determined pressure within the range of 21 to 32 bar may concentrate the dairy product since the pressure is sufficient to initiate reverse osmosis at the RO filter.

The step of homogenizing the stabilized concentrated dairy product may be performed subsequent to the step of heating the stabilized concentrated dairy product. The step of homogenizing the stabilized concentrated dairy product may be performed prior to the step of heating the stabilized concentrated dairy product. The performing the step of homogenizing the stabilized concentrated dairy product subsequent to or prior to the step of heating the stabilized concentrated dairy product may in turn allow a more flexible method.

The third temperature may be within a range of 120 to 140° C. The third period of time may be within a range of 1 sec to 8 min. Thereby, the step of heating the stabilized concentrated dairy product at the third temperature within a range of 120 to 140° C. for the third period of time within a range of 1 sec to 8 min may reduce microorganisms in the stabilized concentrated dairy product and hence form the heat-treated concentrated dairy product.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
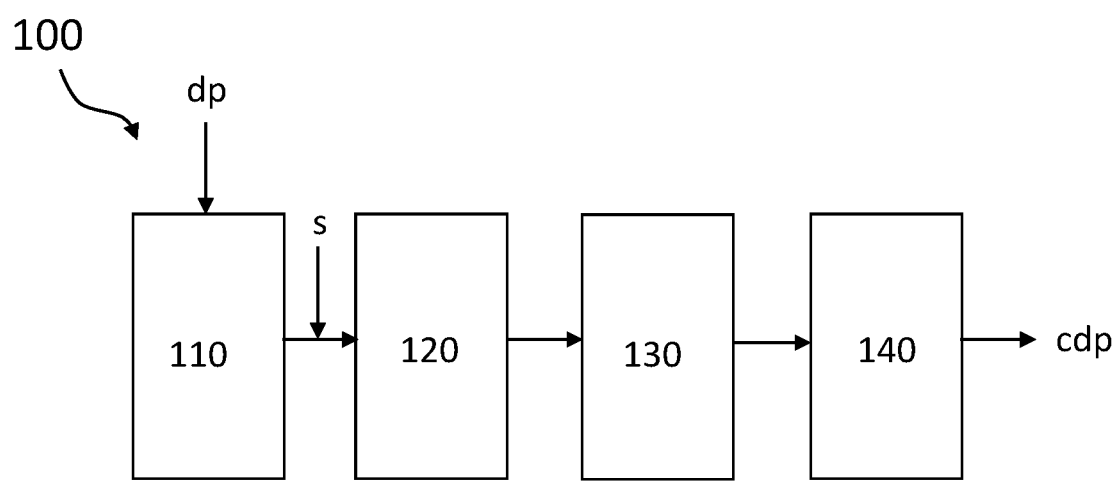
FIG. 1 is a schematic illustration of a system 100 for producing a heat-treated concentrated dairy product.

With reference to FIG. 1 a system 100 is illustrated. The system 100 may be used to produce a heat-treated concentrated dairy product cdp. In the following a heat-treated concentrated dairy product cdp and the system 100 in relation to producing a heat-treated concentrated dairy product cdp will be described. The heat-treated concentrated dairy product cdp is typically a UHT treated or pasteurized concentrated dairy product. Examples of concentrated dairy products are sweetened and unsweetened condensed milk. Examples of dairy products dp are various kinds of milk such as semi-skimmed milk, skimmed milk, and whole milk.

In connection with FIG. 1, the system 100 comprises a RO filter 110. The RO filter 110 may comprise one RO filter. The RO filter 110 may comprise a plurality of RO filters arranged in series. Moreover, a plurality of RO filters 110 may be arranged in parallel. A plurality of RO filters 110 may be arranged in series and in parallel. The RO filter 110 may comprise one or a plurality of membranes. FIG. 1 shows that a dairy product dp is provided to the RO filter 110. The RO filter 110 may comprise a balance tank to receive the dairy product dp. The RO filter 110 may further comprise one or more feed pumps and one or more high pressure centrifugal pumps. The one or more feed pumps may facilitate pumping the dairy product dp into the RO filter 110. The one or more high pressure centrifugal pumps may increase a pressure of the received dairy product dp, prior to passing through the membrane(s) of the RO filter 110. The one or more high pressure centrifugal pumps may increase the pressure of the dairy product dp until a desired pre-determined pressure is achieved. The pre-determined pressure may be within a range of 21 to 32 bar. The dairy product dp next passes under the pre-determined pressure through the RO filter 110 i.e. through the membrane(s) of the RO filter 110. The pre-determined pressure is sufficient to allow reverse osmosis such that the RO filter 110 concentrates the dairy product dp. Subsequent to passing of the dairy product dp through the membrane(s) of the RO filter 110, the dairy product dp may be divided to a retentate stream and a permeate stream. The retentate stream does not pass through the membrane(s) and forms the concentrated dairy product dp. The permeate stream is a portion of water content of the dairy product that passes through the membrane(s). The permeate stream may be discarded or used for other purposes. The RO filter 110 may further comprise a control valve. The control valve may be controlled to control the pressure over the membrane of the RO filter 110 and/or the amount of dairy product dp being fed to the RO filter 110. For instance, the control valve may be controlled based on an instant pressure at the RO filter 110 and/or based on a ratio calculated from a flow of the received dairy product and a flow of the retentate stream. The RO filter 110 may further comprise filtration loops. In the filtration loops the dairy product dp may pass through one or a plurality of loop pumps. The loop pump(s) may circulate the concentrated dairy product dp i.e. the retentate stream through the RO filter 110 until a pre-determined concentration of the dairy product dp is achieved. The loop pump(s) may also ensure sufficient flow of the dairy product dp over the membrane surface(s) so as to minimize fouling of the membrane(s). Upon achieving the pre-determined concentration of the dairy product dp, the concentrated dairy product dp may exit the RO filter 110. The RO filter 110 may operate at a first temperature. The first temperature may be within a range of 0 to 10° C.

Still in connection with FIG. 1, subsequent to passing 210 the dairy product dp through the RO filter 110, a stabilizing salts may be added to the concentrated dairy product dp.

Still in connection with FIG. 1, the system 100 further comprises a pre-heating unit 120. FIG. 1 shows that the pre-heating unit 120 receives the concentrated dairy product dp with the optionally added stabilizing salt s. The pre-heating unit 120 pre-heats the concentrated dairy product dp at a second temperature for a second period of time. The pre-heating unit 120 stabilizes the concentrated dairy product dp. The second temperature may be within a range of 95 to 125° C. The second period of time may be within a range of 30 sec to 6 min. The pre-heating unit 120 may be any conventional heating unit. For instance, the pre-heating unit 120 may be a tube type heat exchanger. The tube type heat exchanger may comprise straight and corrugated tubes. The tube type heat exchanger may provide optimal performance, long production time and low maintenance costs. Alternatively a plate type heat exchanger may be used as the pre-heating unit 120. The pre-heating unit 120 may comprise a plurality of heat exchangers of different types.

Still in connection with FIG. 1, the system 100 further comprises a homogenizing unit 130. FIG. 1 shows that the homogenizing unit 130 is arranged downstream the pre-heating unit 120. The homogenizing unit 130 reduces a size of particles in the stabilized concentrated dairy product dp. The homogenizing unit 130 may improve a homogeneity, stability and mouthfeel of the stabilized concentrated dairy product dp. The homogenizing unit 190 may be any conventional homogenizing unit which per se is known in the art.

Still in connection with FIG. 1, the system 100 further comprises a heating unit 140. FIG. 1 shows that the heating unit 140 is arranged downstream the homogenizing unit 130. The heating unit 140 heats the stabilized concentrated dairy product at a third temperature for a third period of time to reduce microorganisms in the stabilized concentrated dairy product. The third temperature may be within a range of 120 to 140° C. The third period of time may be within a range of 1 sec to 8 min. The heating unit 140 may be may be any conventional heating unit. The heating unit 140 may provide UHT treatment or pasteurization. For instance, the heating unit 140 may perform the UHT treatment using a direct or an indirect heating. In the case of the direct UHT heating, the heating unit 140 may inject steam into the stabilized concentrated dairy product dp. In the case of the indirect UHT heating, the heating unit 140 may heat the stabilized concentrated dairy product dp in an indirect manner. In other words, in the case of the indirect UHT heating, the plant milk base MB may not come into direct contact with the heat source but may instead be heated by a heat exchanger. In this case, the heat exchanger may e.g. be a plate type heat exchanger. FIG. 1 shows that the outlet of the heating unit 140 is the heat-treated concentrated dairy product cdp.

Still in connection with FIG. 1, the RO filter 110, the pre-heating unit 120, the homogenizing unit 130, and the heating unit 140 may be arranged in any order, provided that the heating unit 140 is arranged downstream the pre-heating unit 120 in a direct or an indirect manner. For instance, the system 100 may be arranged such that the RO filter 110 may be arranged downstream the pre-heating unit 120, the homogenizing unit 130 may be arranged downstream the RO filter 110 and the heating unit 140 may be arranged downstream the homogenizing unit 130.

Figure 2:
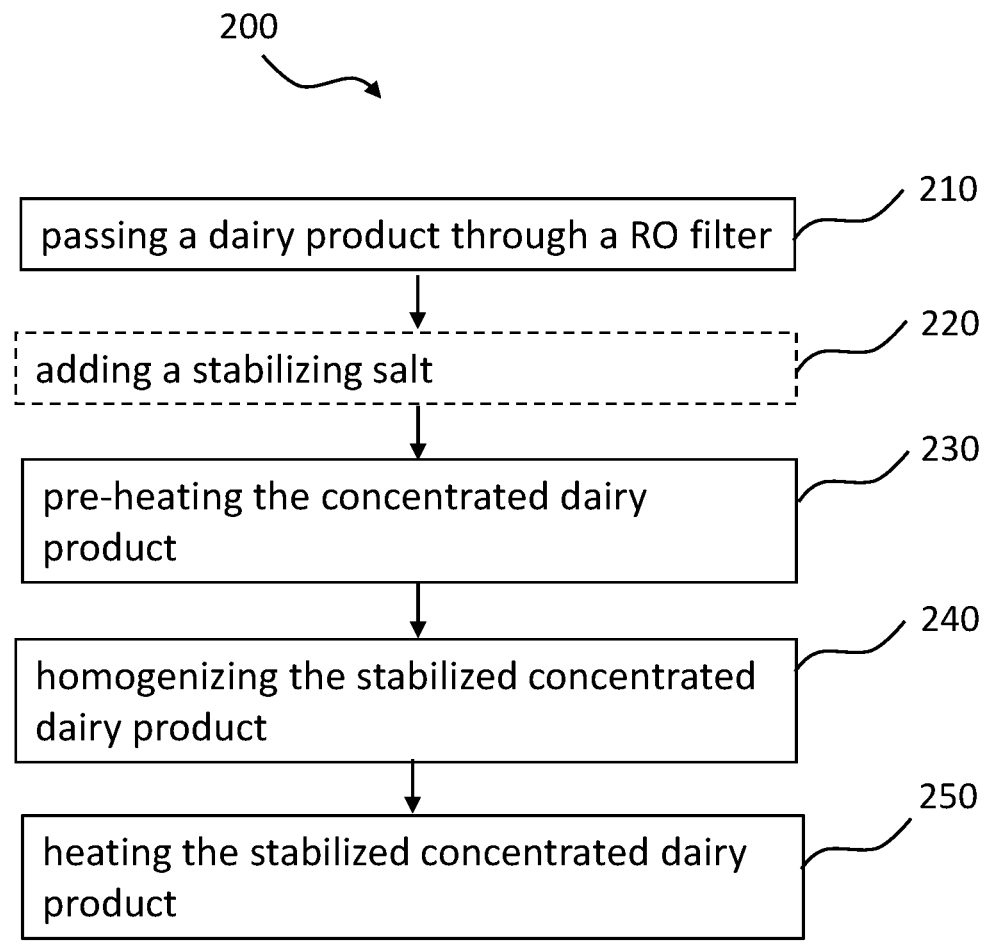
FIG. 2 is a block scheme of a method 200 for producing a heat-treated concentrated dairy product.

In connection with FIG. 2, a block scheme of a method 200 for producing a heat-treated concentrated dairy product cdp is illustrated. The method 200 comprises passing 210 the dairy product dp under a pre-determined pressure through a reverse osmosis, RO, filter 110 at a first temperature, the pre-determined pressure being sufficient to allow reverse osmosis, thereby concentrating the dairy product dp. The step of passing 210 the dairy product through the RO filter 110 may be performed using the RO filter 110 or a plurality of RO filters 110, as described above. The step of passing 210 the dairy product through the RO filter 110 may be performed, as described above.

The method 200 may further comprise subsequent to the step of passing 210 the dairy product dp through the RO filter 110, adding 220 a stabilizing salt s to the concentrated dairy product dp. The step of adding 220 the stabilizing salt s to the concentrated dairy product dp may be performed, as described above.

The method 200 further comprises pre-heating 230 the concentrated dairy product dp at a second temperature for a second period of time to stabilize the concentrated dairy product dp. The step of pre-heating 230 the concentrated dairy product dp may be performed using the pre-heating unit 120, as described above. The step of pre-heating 230 the concentrated dairy product dp may be performed, as described above.

The method 200 further comprises homogenizing 240 the stabilized concentrated dairy product dp to reduce a size of particles in the stabilized concentrated dairy product dp. The step of homogenizing 240 the stabilized concentrated dairy product dp may be performed using the homogenizing unit 130, as described above. The step of homogenizing 240 the stabilized concentrated dairy product dp may be performed, as described above.

The method further comprises heating 250 the stabilized concentrated dairy product dp at a third temperature for a third period of time to reduce microorganisms in the stabilized concentrated dairy product dp, thereby forming the heat-treated concentrated dairy product cdp. The step of heating 250 the stabilized concentrated dairy product dp may be performed using the heating unit 140, as described above. The step of heating 250 the stabilized concentrated dairy product dp may be performed, as described above.

The method 200 may be performed in any order, provided that the step of pre-heating 230 is performed prior to the step of heating 250. The step of pre-heating 230 of the dairy product dp may be performed subsequent to the step of passing 210 the dairy product dp through the RO filter 110. The step of pre-heating 230 of the dairy product dp may be performed prior to the step of passing 210 the stabilized dairy product dp through the RO filter 110. The step of homogenizing 240 the stabilized concentrated dairy product dp may be performed subsequent to the step of heating 250 the stabilized concentrated dairy product dp. The step of homogenizing 240 the stabilized concentrated dairy product dp may be performed prior to the step of heating 250 the stabilized concentrated dairy product dp.

From the description above follows that, although various embodiments of the invention have been described and shown, the invention is not restricted thereto, but may also be embodied in other ways within the scope of the subject-matter defined in the following claims.

The invention claimed is:

1. A method for producing a heat-treated concentrated dairy product (cdp), the method comprising the steps of:
    passing a dairy product under a pre-determined pressure through a reverse osmosis filter at a first temperature within a range of 0 to 10° C. for a first period of time, the pre-determined pressure being sufficient to allow reverse osmosis, thereby concentrating the dairy product,
    pre-heating the dairy product at a second temperature within a range of 95 to 125° C. for a second period of time within a range of 30 sec to 6 min to stabilize the dairy product,
    homogenizing the dairy product to reduce a size of particles in the dairy product, and
    heating the dairy product at a third temperature within a range of 120 to 140° C. for a third period of time to reduce microorganisms in the dairy product, thereby forming the heat-treated concentrated dairy product (cdp),
    wherein the step of homogenizing the dairy product is performed prior to the step of heating the dairy product.

2. The method according to claim 1, the method further comprising, subsequent to the step of passing the dairy product through the reverse osmosis filter, adding a stabilizing salt(s) to the dairy product.

3. The method according to claim 1, wherein the step of passing the dairy product through the reverse osmosis filter further comprises circulating the dairy product through the reverse osmosis filter until a pre-determined concentration of the dairy product is achieved.

4. The method according to claim 1, wherein the step of pre-heating the dairy product is performed subsequent to the step of passing the dairy product through the reverse osmosis filter.

5. The method according to claim 1, wherein the step of pre-heating the dairy product is performed prior to the step of passing the dairy product through the reverse osmosis filter.

6. The method according to claim 1, wherein a total solid content of the heat-treated concentrated dairy product is in a range from 25 to 32 wt %.

7. The method according to claim 1, wherein a fat content of the heat-treated concentrated dairy product (cdp) is in a range from 5 to 15 wt %.

8. The method according to claim 1, wherein the pre-determined pressure is within a range of 21 to 32 bar.

9. The method according to claim 1, wherein the third period of time is within a range of 1 sec to 8 min.

* * * * *